US011711780B2

(12) United States Patent
Agarwal et al.

(10) Patent No.: US 11,711,780 B2
(45) Date of Patent: Jul. 25, 2023

(54) BASE STATION WITH INTERFERENCE MONITORING CIRCUIT

(71) Applicant: Parallel Wireless, Inc., Nashua, NH (US)

(72) Inventors: Kaitki Agarwal, Westford, MA (US); Shray Mishra, Westford, MA (US); Jitender Arora, Westford, MA (US); Eric Mrozinski, Westford, MA (US); Michael Yasuhiro Saji, Brookline, MA (US)

(73) Assignee: Parallel Wireless, Inc., Nashua, NH (US)

( * ) Notice: Subject to any disclaimer, the term of this patent is extended or adjusted under 35 U.S.C. 154(b) by 0 days.

(21) Appl. No.: 15/974,669

(22) Filed: May 8, 2018

(65) Prior Publication Data
US 2018/0324742 A1 Nov. 8, 2018

Related U.S. Application Data

(60) Provisional application No. 62/503,305, filed on May 8, 2017.

(51) Int. Cl.
*H04W 64/00* (2009.01)
*H04W 76/27* (2018.01)
(Continued)

(52) U.S. Cl.
CPC ....... *H04W 64/003* (2013.01); *H04J 11/0056* (2013.01); *H04J 11/0093* (2013.01);
(Continued)

(58) Field of Classification Search
CPC ... H04W 64/003; H04W 48/16; H04W 16/26; H04W 76/27; H04W 84/005;
(Continued)

(56) References Cited

U.S. PATENT DOCUMENTS

| 5,867,813 A | 2/1999 | Di Pietro et al. |
| 6,751,457 B1 | 6/2004 | Martin |

(Continued)

FOREIGN PATENT DOCUMENTS

| EP | 1045601 A1 | 10/2000 |
| EP | 1654625 B1 | 5/2016 |

OTHER PUBLICATIONS

"Huawei ME909u-521 LTE LGA Module Application Guide," Feb. 28, 2014, Huawei Technologies Co., Ltd.

*Primary Examiner* — Yu-Wen Chang
(74) *Attorney, Agent, or Firm* — Michael Y. Saji; David W. Rouille

(57) ABSTRACT

A base station is disclosed, comprising: a processor; a memory coupled to the processor; a base station access radio coupled to the processor; a user equipment module, coupled to the processor, for providing a backhaul link for the base station; and a sniffing circuit coupled to the processor. The sniffing circuit further comprises: a radio receiver coupled to an amplifier and a filter, the amplifier and the filter both capable of being used across a plurality of frequencies; and a baseband processor coupled to the radio receiver, configured to convert a received signal from the radio receiver to a baseband frequency, to determine whether the received signal is one of a 2G, 3G, 4G, Wi-Fi, or 5G signal, to measure a signal strength of the received signal, and to identify a synchronization signal within the received signal.

20 Claims, 6 Drawing Sheets

(51) Int. Cl.
  *H04W 16/26* (2009.01)
  *H04L 27/26* (2006.01)
  *H04J 11/00* (2006.01)
  *H04W 48/16* (2009.01)
  *H04W 88/08* (2009.01)
  *H04B 1/00* (2006.01)
  *H04W 84/00* (2009.01)

(52) U.S. Cl.
  CPC ......... *H04L 27/2607* (2013.01); *H04W 16/26* (2013.01); *H04W 48/16* (2013.01); *H04W 76/27* (2018.02); *H04B 1/005* (2013.01); *H04W 84/005* (2013.01); *H04W 88/085* (2013.01)

(58) Field of Classification Search
  CPC ............... H04W 88/085; H04J 11/0093; H04J 11/0056; H04L 27/2607; H04B 1/005
  See application file for complete search history.

(56) References Cited

U.S. PATENT DOCUMENTS

| | | | |
|---|---|---|---|
| 8,699,430 B2 | 4/2014 | Chandramouli et al. | |
| 8,781,797 B1 | 7/2014 | Oltman et al. | |
| 9,209,857 B2 | 12/2015 | Galeev et al. | |
| 9,867,199 B1* | 1/2018 | Pawar | H04W 72/0486 |
| 2003/0003874 A1* | 1/2003 | Nitta | H04W 72/082 455/67.11 |
| 2003/0035388 A1* | 2/2003 | Schmidt | H04L 63/04 370/329 |
| 2003/0048791 A1 | 9/2003 | De Cnodder et al. | |
| 2007/0287501 A1* | 12/2007 | Hoshina | H04W 52/367 455/562.1 |
| 2008/0075003 A1 | 3/2008 | Lee et al. | |
| 2008/0268833 A1 | 10/2008 | Huang et al. | |
| 2008/0311927 A1 | 12/2008 | Boman et al. | |
| 2009/0215443 A1 | 8/2009 | Dickey et al. | |
| 2009/0270079 A1 | 10/2009 | Han et al. | |
| 2010/0005178 A1 | 1/2010 | Sinderlaru et al. | |
| 2010/0110886 A1 | 5/2010 | Sorri et al. | |
| 2010/0130194 A1* | 5/2010 | Dickey | H04W 24/00 455/424 |
| 2011/0080274 A1* | 4/2011 | Reed | B60K 28/066 340/425.5 |
| 2011/0286411 A1* | 11/2011 | Kim | H04L 5/0007 370/329 |
| 2012/0058772 A1* | 3/2012 | Kazmi | H04W 72/048 455/450 |
| 2012/0113837 A1 | 5/2012 | Siomina et al. | |
| 2012/0113844 A1 | 5/2012 | Krishnamurthy | |
| 2012/0214550 A1* | 8/2012 | Galaro | H04W 52/0206 455/561 |
| 2012/0315956 A1* | 12/2012 | Mochida | H04J 11/005 455/561 |
| 2013/0003680 A1* | 1/2013 | Yamamoto | G01S 5/0205 370/329 |
| 2013/0003697 A1 | 1/2013 | Adjakple et al. | |
| 2013/0072146 A1 | 3/2013 | Smith | |
| 2013/0084809 A1 | 4/2013 | Johansson et al. | |
| 2013/0188624 A1* | 7/2013 | Lee | H04W 24/02 370/338 |
| 2013/0194950 A1* | 8/2013 | Haghighat | H04L 5/0073 370/252 |
| 2013/0301468 A1 | 11/2013 | Lee et al. | |
| 2013/0344878 A1* | 12/2013 | Whinnett | H04W 56/001 455/450 |
| 2014/0073306 A1 | 3/2014 | Shetty et al. | |
| 2014/0119359 A1* | 5/2014 | Horneman | H04W 16/14 370/338 |
| 2014/0146697 A1 | 5/2014 | Kim et al. | |
| 2014/0206341 A1 | 7/2014 | Siomina et al. | |
| 2014/0220972 A1* | 8/2014 | Appel | H04W 36/0055 455/436 |
| 2014/0357224 A1* | 12/2014 | Walley | H04M 15/8038 455/407 |
| 2015/0004968 A1* | 1/2015 | Carmon | H04W 24/10 455/434 |
| 2015/0056931 A1 | 2/2015 | Yerramalli et al. | |
| 2015/0092552 A1* | 4/2015 | Bajj | H04W 28/08 370/235 |
| 2015/0092578 A1 | 4/2015 | Ingale et al. | |
| 2015/0103755 A1 | 4/2015 | Cui et al. | |
| 2015/0296391 A1 | 10/2015 | Kotkar et al. | |
| 2015/0334750 A1* | 11/2015 | Mehta | H04W 76/10 370/329 |
| 2016/0150576 A1* | 5/2016 | Moisio | H04W 4/023 370/329 |
| 2016/0234819 A1* | 8/2016 | da Silva | H04L 41/5054 |
| 2016/0262092 A1 | 9/2016 | Lee | |
| 2016/0277937 A1* | 9/2016 | Yilmaz | H04W 72/0446 |
| 2016/0277992 A1 | 9/2016 | Cao | |
| 2017/0013513 A1 | 1/2017 | Agarwal et al. | |
| 2017/0111954 A1* | 4/2017 | Wilhelmsson | H04W 64/006 |
| 2017/0374669 A1* | 12/2017 | Kahtava | H04W 72/082 |
| 2018/0096587 A1 | 4/2018 | Erman et al. | |
| 2018/0206197 A1* | 7/2018 | Daniel | H04W 52/346 |
| 2018/0288670 A1* | 10/2018 | Li | H04W 8/186 |
| 2021/0345135 A1 | 11/2021 | Bendlin et al. | |

\* cited by examiner

BASE STATION WITH INTERFERENCE MONITORING CIRCUIT

CROSS-REFERENCE TO RELATED APPLICATIONS

This application claims priority under 35 U.S.C. § 119(e) to U.S. Provisional Pat. App. No. 62/503,305, entitled "Base Station with Interference Monitoring Circuit" and filed on May 8, 2017, which is also hereby incorporated by reference in its entirety for all purposes. This application also hereby incorporates by reference for all purposes U.S. Pat. App. Pub. No. 2014/0086120 A1, entitled "Heterogeneous Mesh Network and a Multi-RAT Node Used Therein," filed on May 8, 2013; U.S. Pat. App. Pub. No. 2014/0133456 A1, entitled "Dynamic Multi-Access Wireless Network Virtualization," filed Sep. 24, 2013; U.S. Pat. App. Pub. No. 2014/0233412 A1, entitled "Methods of Incorporating an Ad Hoc Cellular Network into a Fixed Cellular Network," filed Feb. 18, 2014; U.S. Pat. App. Pub. No. 2014/0092765 A1, entitled "Heterogeneous Self-Organizing Network for Access and Backhaul," filed on Sep. 12, 2013; U.S. Pat. App. Pub. No. 2014/0126410 A1, entitled "Heterogeneous Self-Organizing Network for Access and Backhaul," filed on Jan. 3, 2014; U.S. Pat. App. Pub. No. 2015/0173111 A1, entitled "Virtualization of the Evolved Packet Core to Create a Local EPC," filed Dec. 15, 2014; U.S. Pat. App. Pub. No. 2016/0119867 A1, entitled "Out-of-Band Power Down Notification," filed Oct. 26, 2015; U.S. Pat. App. Pub. No. 2016/0135132 A1, entitled "Self-Calibrating and Self-Adjusting Network," filed on Nov. 9, 2015; and U.S. Pat. App. Pub. No. 2016/0142880 A1, entitled "Enhanced Mobile Base Station," filed Nov. 19, 2015. The incorporated matter may be considered to further define any of the functions, methods, and systems described herein.

BACKGROUND

Emergency first-responders have had the issue of responding to emergencies in area of poor coverage, such as rural areas. This poor coverage hinders their ability to successfully communicate with other first responders and ultimately could endanger the people they are trying to help. Thus, a base station for use in emergency first-responders' vehicle may behave as a miniature cellular service provider that directly caters to the needs of emergency first-responders by creating a small range of cellular coverage that they can use in areas where they otherwise could not. However, the system may struggle, or may need to adjust its power levels, when it is within the range of an external cellular service provider, for example, cell towers, since the signal that the base station creates may potentially interfere with the signal from the cell tower. Thus, the in-vehicle base station needs an internal mechanism that can discern whether or not the vehicle is in range of a cell tower, and either adjust its signal power levels accordingly, or to conclude it is better to remain off.

For example, when an emergency first responder vehicle that utilizes the in-vehicle base station drives into the area of coverage of a very strong macro cell, the first responders' UE will have limited to no service due to excessive interference between the in-vehicle base station's signal and the Macro's signal. This lack of service could jeopardize the first responders' operations because it could prevent them from receiving critical information from their stations and could ultimately endanger the civilians that they protect.

Additionally, the fact that the base station is a mobile base station implies, in some cases, that: no a priori information is available about the base station's location that can be used to identify a location of undesirable interference; and that the base station radio is required to be available for use with short notice, especially if the mobile base station is being used in a public safety application.

SUMMARY

A base station with interference monitoring circuit is disclosed.

In a first embodiment, a base station is disclosed, comprising: a processor; a memory coupled to the processor; a base station access radio coupled to the processor; a user equipment module, coupled to the processor, for providing a backhaul link for the base station; and a sniffing circuit coupled to the processor. The sniffing circuit may further comprise a radio receiver coupled to an amplifier and a filter, the amplifier and the filter both capable of being used across a plurality of frequencies; and a baseband processor coupled to the radio receiver, configured to convert a received signal from the radio receiver to a baseband frequency, to determine whether the received signal is one of a 2G, 3G, 4G, Wi-Fi, or 5G signal, to measure a signal strength of the received signal, and to identify various signals or channels within the received signal. The signals may be synchronization signals. The base station may be a mobile vehicle base station. The sniffer circuit may be enabled to operate continuously and asynchronously and to report information to the processor, periodically, on demand, or based on a change in a monitored signal.

In some embodiments, he sniffer circuit may be coupled to a wideband radio frequency filter and a wideband radio frequency power amplifier. The sniffer circuit may be coupled to a software-defined radio and may be configured to retune the software-defined radio to receive signals in specific frequency bands. The specific frequency bands may be selected from the set of global (2G, 3G, 4G, 5G, TVWS, military, public safety, ISM, Aor other) transmission bands. The sniffer circuit may be configured to receive samples and process the samples using a WCDMA algorithm, an OFDM algorithm, or a TDMA algorithm, sequentially or in parallel, thereby determining a signal type of the received samples. The sniffer circuit may be configured to extract an (E)ARFCN-related or cell related information from the processed information. The sniffer circuit may be configured to determine one or more of EARFCN, signal strength on one or more (E)ARFCNs, typical basic cell information such as PLMN ID, PSC, PCI, ECGI, or other information relevant e.g. for supporting mobility. The sniffer circuit may be configured to identify specific signals, their power, and/or the information they carry, and to create a corresponding neighbor relation table. The EARFCN or cell ID enables the identification of a specific cell and/or network of the interferer, enabling the base station to avoid further interference as well as enabling the base station, in conjunction with the coordinating server, to perform coordination with the detected interfering cell or network to reduce or mitigate interference.

In some embodiments The output of the sniffer circuit may be coupled to a self-organizing network (SON) module, enabling the SON module to perform one or more of: maintaining a neighbor list, determining current and maximum potential power of adjacent cells; coordinating power budgets and hence coverage and capacity with neighbor cells; coordinating selection of RAT or standup of an access network; and providing analytics. The measurements provided by the sniffer circuit may be stored together with a positioning coordinate, such as GPS, or a timestamp, or both, in a database. The database may be located at the base station, at a coordinating server, or in the core network. The sniffer circuit may be turned off or on based on a vehicle ignition status or vehicle velocity. The output of the sniffer circuit may be sent to a SON module located at a coordinating server, the coordinating server acting as a gateway between a radio access network and one or more core networks. The SON module located at the coordinating server may perform one or more of: maintaining a neighbor list, determining current and maximum potential power of adjacent cells; coordinating power budgets and hence coverage and capacity with neighbor cells; coordinating selection of RAT or standup of an access network; and providing analytics; or any combination thereof.

In some embodiments the base station may be a mobile base station providing access in a moving vehicle, the base station being configured to detect nearby radio frequency sources using the sniffing circuit. The base station may be a mobile base station providing LTE access in a moving vehicle, the base station being configured to detect nearby radio frequency sources using the sniffing circuit and to turn itself on and off or to adjust power budget for modifying coverage or capacity, to reduce or contain interference with other base station in proximity of the vehicle.

In some embodiments the base station may further comprise a plurality of sniffer circuits. The base station may further comprise an RF switch or a digital switch for RF sample data, and the sniffer circuit may further comprise a plurality of layer-1/physical layer (L1/PHY) processing modules, each of the plurality of L1/PHY processing modules supporting one of 2G, 3G, 4G, Wi-Fi, WiMax, or 5G radio access technology. The RF switch may send a single set of RF I/Q samples to the plurality of L1/PHY processing modules. The RF switch may be one of an Ethernet switch or a common public radio interface (CPRI) switch, or a direct coupling of RF signals to each of the plurality of processing modules. The L1/PHY processing module of the plurality of L1/PHY processing modules may provide partial network processing, the partial network processing including processing of one or more EARFCN, signal strength, PLMN ID, PCI, ECGI, or other information found in typical UE measurement reports. The sniffer circuit may be implemented on a chip, a field programmable gate array (FPGA), or a baseband processor.

The sniffer circuit may be, in some embodiments, decoupled from the layer 1 or physical layer of the base station may sniff nearby cells of RAT other than a RAT supported by the base station. The plurality of sniffer circuit may support different RATs; same RAT, different frequency range; same RAT, same frequency range. The plurality of sniffer circuit may be turned on or off to improve detection speed or power conservation characteristics. The sniffer circuit may be a hardware plug-in module, the hardware plug-in module may include a baseband processor, the baseband processor may be enabled to provide sniffing for a radio access technology. The sniffer circuit may be a hardware plug-in module, the hardware plug-in module may include a baseband processor, the baseband processor may be enabled to provide sniffing for one or more radio access technologies.

The sniffer circuit may share one or more components of an RF chain with other modules of the base station, and the other modules may be transceivers of the base station or the UE module at the base station. The sniffer circuit may operate on frequency bands and with RATs not supported by the base station. The sniffer circuit may have a PHY, MAC layer, RLC layer, PDCP layer, RRC layer and sniffer application layer in a bottom to top order. Alternately, the sniffer circuit may have only a PHY layer and sniffer application layer, or any subset or sub-combination of the layers described above. The sniffer circuit may have a PHY, MAC layer, RLC layer, and sniffer application layer. The sniffer circuit may have an interface between the PHY and the sniffer application layer, and the interface may support communication between the PHY and the sniffer application layer to request and report cell search and measurement reports. The plurality of L1/PHY processing modules may receive I and Q samples received at the base station antenna as an input to detect a cell signal from neighbor cells.

DETAILED DESCRIPTION

Figure 1:
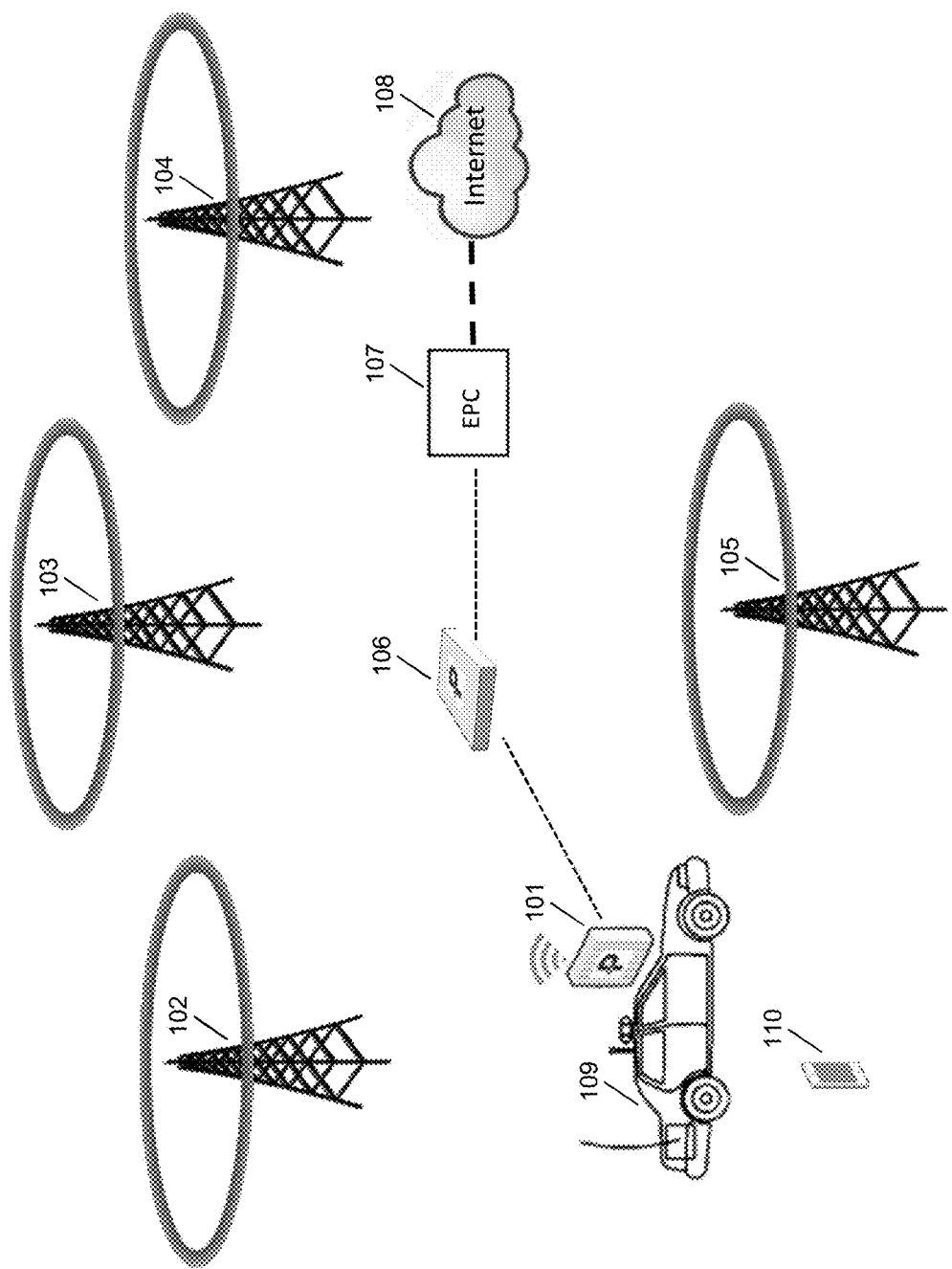
FIG. 1 is an exemplary network diagram showing in-vehicle base station in a cellular radio access network.

The detailed description set forth below is intended as a description of various configurations of the subject matter and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details. In some instances, well-known structures and components are shown in block diagram form to avoid obscuring the concept of the subject technology. Features and aspects of one embodiment may be used in conjunction with another embodiment.

Overview

To solve the issue of signal interference, the in-vehicle base station can implement a "Sniffing Device" that can detect signals from cell towers and make the in-vehicle base station stop providing signal if it detects predominant coverage from a cell tower and have the in-vehicle base station turn coverage back on if the vehicle moves out of the coverage zone. In some embodiments, the sniffing device's design will be similar to a greatly simplified cellphone or UE. It will filter out signal from the in-vehicle base station but still receive signals from external sources. When the sniffing device is out of range of an external signal, it will not detect anything, and therefore it activates the in-vehicle base station. Additionally, when it is in range of a strong macro-cell, the sniffing device will detect the predominant signal, and it will consequently deactivate, or keep inactive the in-vehicle base station.

In some embodiments, this sniffing device, in conjunction with dynamic coverage management (DCM), solves the issue of interference between in-vehicle base station signal and macro signals by specifically searching for macro signals. Some embodiments of the disclosure would do so by containing a chip tailored to detecting a specific type of signal(s) that would be expected from the macro (e.g. 3G, 4G, LTE, or like of it). The chip would relay a command or processed data the chip had received to the base station primary processor that would toggle whether or not the in-vehicle base station, or a base station, provides service, or may provide information to enable this decision, for example, at a SON module. In some embodiments, power and service determinations may be made at the base station or at a coordinating SON server, or in coordination by multiple components. When the chip in the DCM detects the signal form the vehicle entering the coverage zone, in some embodiments, the in-vehicle base station may stop providing coverage to the UE in the vehicle and start once the DCM stops detecting a macro signal. The DCM prevents signal interference and therefore prevents gaps in coverage when first responders using the in-vehicle base station are traveling to the location of the emergency. Thus, they will be able to receive information from their operators and other first responders who may be far away with no interruption. The in-vehicle base station may be a multi-radio access technology (RAT) base station and may support access, sniffing, and/or SON on 2G, 3G, 4G, 5G, Wi-Fi, WiMax, and other similar technologies. In the present disclosure, the in-vehicle base station may also be referred to as a mobile base station, or in-vehicle eNodeB, in-vehicle nodeB, etc., and further definition of these concepts and features which may be considered to further describe the functions and features of various embodiments is found in the documents incorporated by reference above.

Some embodiments of the present disclosure contemplate the use of a coordinating server, having some or all of the specific features of the Parallel Wireless HetNet Gateway, described herein and in the incorporated documents. Through its HetNet Gateway (HNG) (TM), the Parallel Wireless solution can orchestrate and manage the Radio Access Network (RAN) across multiple technologies, including 3G, 4G and Wi-Fi, with high ease of use. The centerpiece of the Parallel Wireless solution is the HetNet Gateway, which is the wireless industry's first carrier-grade, high-performance RAN orchestrator that is based on software-defined networking (SDN) and network functions virtualization (NFV), and is compliant with the open and standard interfaces as defined by the 3rd Generation Partnership Project (3GPP). The Parallel Wireless HNG virtualizes the RAN interfaces to manage the 4G and 3G (Long Term Evolution, or LTE, and universal mobile telecommunications system, or UMTS) RANs (Home NodeBs/NodeBs, eNodeBs/HeNodeBs and in-vehicle base stations) in real-time via multi-technology self-organizing network (SON) and gateway functionality while abstracting RAN changes from the core network and the core network itself from the RAN. The Parallel Wireless HNG virtualizes thousands of base stations to look like a smaller number of virtualized "boomer cells" to the core. The Parallel Wireless HNG also virtualizes radio network nodes such as Wi-Fi access points (APs), eNodeBs and NodeBs and makes them self-configurable, self-adjustable, and self-healing, helping with initial installation and ongoing maintenance. The Parallel Wireless HNG acts like a virtual radio network controller (vRNC or virtual RNC) for multi-RAT network handling resources for different technologies 3G, LTE/4G and Wi-Fi while optimizing call processing towards radio and core network elements such as the mobile switching center (MSC), serving global packet radio system (GPRS) support node (SGSN), gateway GPRS support node (GGSN), evolved packet core (EPC) for 4G, home subscriber server (HSS), and policy charging and rules function (PCRF). The HNG may also be referred as a coordinating server, a coordination server, a gateway, a cloud coordination server, or a gateway server in this disclosure. In some embodiments, a gateway server may be used; in other embodiments, the server may not be required to be positioned in the network as a gateway and may be used for its coordinating ability only.

In an LTE network, the HetNet Gateway (Parallel Wireless HNG) node logically and physically sits between the eNodeBs including in-vehicle base stations and the MNO Evolved Packet Cores (EPCs). It orchestrates and concentrates thousands of base stations and presents itself as a single "base station" or base station controller (in 2G: BSC, 3G: RNC, 4G: eNB) to the MNO packet core. The Parallel Wireless HNG virtualizes the radio network resources such as eNodeBs and backhaul and makes them self-configurable and self-adjustable. It acts as HeNBGW and vRAN/virtual eNB. It allows plug and play operation of CWS nodes and mesh backhaul, and allows them to form an ad hoc network as the nodes come in to the network and leave. In a 3G network, the Parallel Wireless HNG provides the Home Node B Gateway and virtual RNC functionality. For Wi-Fi, the Parallel Wireless HNG acts as a Wireless LAN Controller (WLC), Evolved Packet Data Gateway (ePDG) and Trusted Wireless Access Gateway (TWAG). These are all configurable options and one or the other can be configured based on an operator's requirements. In some configurations Parallel Wireless HNG also acts as an EPC. The HetNet Gateway sits between the RAN and the core network, and as a result is in a position to provide proxying and virtualization for any-G and for any core or multiple cores, as well as being able to perform deep packet inspection and lawful intercept for data flowing through the network that would be encrypted if intercepted at a different point in the network.

The Parallel Wireless Converged Wireless System, otherwise known as the Parallel Wireless base station or the Converged Wireless System (CWS) (TM), is a multi-RAT base station with LTE, Wi-Fi, and 3G technologies that provides a flexible outdoor and in-vehicle solution in conjunction with the Parallel Wireless HNG. The combined system is a cloud-based network orchestration system that maximizes virtualization, and functions in a 3GPP standards-based Heterogeneous Network (HetNet) to bring 3G, Wi-Fi and 4G operators better technology at lower cost. The Parallel Wireless solution addresses key challenges in delivering 3G/4G coverage, capacity, and quality of service (QoS), regardless of the cell size, e.g., femtocell, pico cell, micro cell, metro cell, or macro cell. The Parallel Wireless solution is also easy to deploy with automated configuration and ongoing optimization. The CWS may also be referred to as eNodeB, NodeB, Home NodeB (HNB), Evolved-HNB (eHNB), base station, in-vehicle base station, etc. in this disclosure. In this disclosure where a base station is mentioned, depending on the context an in-vehicle base station or the Parallel Wireless CWS may also be understood to be identified, and the features thereof may be understood to pertain to the described embodiment.

The present disclosure is intended to be used at a base station that is capable of 2G, 3G, 4G, LTE, Wi-Fi, or other similar radio access technology, or any combination thereof. In some embodiments, SON may be performed at the base station, or at a coordinating server, or across both nodes. In some embodiments, SON may be implemented at a coordinating server that may implement multi-RAT Self-Organizing Network (SON) for both access and backhaul SON. SON may run on the coordinating server that logically sits between the radio access network (RAN) and the operator's core network. The SON functionality supports software-defined networking (SDN) and may use XML based interface in addition to dynamic and real-time integration with open-APIs. In some embodiments, SON may allow for dynamic configuration of cell parameters such as automatic neighbor relation (ANR), physical cell identity (PCI), ECGI, power levels, and power management to handle dynamic network changes, and coverage adjustment if a node or base station handled by the coordinating server goes down or gets congested. SON functionality may be divided across the base station and the coordinating server, in some embodiments, in some cases based on availability of certain information at either the coordinating server or the base station.

In some embodiments, the coordinating server (or in certain embodiments the base station on its own, or in conjunction with other SON servers or devices) may dynamically configure cell power level and may assign channel selection to mitigate interference. As the interference is reduced or mitigated, the cell edge user may experience improvement in cellular phone performance. The coordinating server may perform power adjustment of various base stations. However, dynamic configuration of cell power level and interference mitigation requires information about the present state of the network. This information may be, for example, based on user equipment (UE) measurement reports. However, UE measurement reports have drawbacks, such as taking up bandwidth otherwise used for data services, and wasting of UE battery. Battery drain results because the UE performing scanning is time-intensive and processor-intensive. It may also be possible that at certain times, no UE may be available to request to scan and report signal strength or signal quality via UE measurement report to the coordinating server. Also, for UE measurements to happen, the cell must be already operational. But when no cell is operational, or when settings for the cell (IDs, power levels, etc.) have not yet been determined or are unknown, UE measurements cannot be used.

Another aspect of understanding a present state of the local radio environment is identifying nearby cells and networks. A conventional UE performs a cell search procedure in order to connect to the base station to get access to the core network and services offered by the core network, thereby obtaining such identifying information. The UE therefore needs to get details about the nearby eNodeB or cell available to connect to. Therefore, it is a first step as soon as the UE is powered on. This first step is generally known as the cell search procedure, and in this procedure the UE acquires cell specific information. The UE may perform the cell search procedure one or more times depending on network conditions. Further, the cell search procedure further differs depending on the radio access technology, e.g., 2G, 3G, 4G, 5G, Wi-Fi, etc. The inventors have appreciated that it is desirable to acquire this cell-specific information for use by SON processing. However, a conventional RF sniffer does not have the higher-layer capability to obtain this information, as it is limited to observing the presence of RF energy only, not interpreting the RF signals received, nor sending signals to query the network for cell-specific information.

In some embodiments, base stations may also include an RF sniffer module or sniffer circuit which is enabled to perform functions beyond passive energy monitoring, e.g., the sniffer performs the UE's cell search operations. The inventors have appreciated that this sniffer circuit performing limited UE functionality may be decoupled from the layer 1 or physical layer of the base station, and need not be restricted to the radio access technology supported by the physical layer of the base station. Thus, for a 2G base station, its sniffer circuit may be able to sniff nearby cells of 2G radio access technology or another radio access technology, using the concepts and architecture disclosed herein. Likewise, for a 3G nodeB or 4G eNodeB, the sniffer circuit would be able to sniff not only nearby cells of 3G and 4G radio access technologies but of other radio access technologies.

In some embodiments, the inventors have appreciated that some portions of an RF chain could be shared. Sharing of the entire RF chain by the sniffer circuit may be undesirable; for example, a sniffer circuit coupled to an RF receive chain of the base station, or of a UE module at the base station, would be required to share the RF receive chain with the other functions at the base station or UE module. In such a configuration, a sniffer would not be able to operate asynchronously or simultaneously with the other user of the shared RF receive chain. For example, the base station would be restricted to being inactive during phases where sniffing happens, which is not desirable. Higher layer TX functionality in the sniffer would also require sharing with the host RF chain. In the present disclosure, the inventors have appreciated that it is advantageous to have a sniffer circuit with non-shared control over its own RF chain, or at least portions of the RF chain. In some embodiments, the antenna only is shared; in other embodiments, portions of the RF chain can be shared. An example follows. If a host RF chain is configured with antennas, filters and amplifiers tuned to a particular band, such as a desired 3G UMTS band (e.g., Band 1), the sniffer circuit can share these portions of the host RF chain while supplementing the host RF chain with its own radio, baseband processing and higher-layer processing, thereby without limiting the ability of the host RF chain to transmit or receive at any particular time. I and Q samples could be shared among multiple baseband processing modules. In another embodiment, the sniffer circuit performing limited UE functionality may have its own L1 and may be connected to a dedicated RF (receiver only). This allows the sniffer circuit to operate fully independently of the host base station, and therefore simultaneously. It also allows the sniffer circuit to operate on frequency bands and with radio access technologies that are not supported by the host base station, but still need to be considered for mobility purposes.

Also, even if a base station is equipped with a conventional RF sniffer circuit, it takes a lot of resources to continuously sniff nearby cells. Cell search for all nearby possible neighbors requires wide filters and power amplifiers, and it is a time-consuming process. Also, different algorithms are needed for each radio access technology to derive meaningful information for the received signal at the antenna, because each radio access technology uses different signal structure based on CDMA, OFDM, TDMA, etc. This makes it difficult to detect different signal in the same captured data for a given (E)ARFCN, since RF samples needs to be processed through radio access technology-specific algorithms. It therefore is typically too expensive to continuously sniff the nearby cells of all radio access technologies with a conventional separate sniffer circuit and antenna at the base station.

Also, the base station may include a UE module or circuit, such as, for example, a conventional wireless broadband modem provided via an internal USB-connected module and coupled to one or more antennas as appropriate. The UE circuit is also tied to a specific layer 1 or physical layer. The UE circuit has limited functionality when not attached to an access network. Additionally, the UE circuit may generate only specific measurement reports according to a standard, such as the 4G long term evolution (LTE) standard. The UE circuit may further have fixed applications to do certain things and does not provide all data needed by the base station to build neighbor relation table or perform other SON features such as PCI allocation for the detected neighbors. In other words, "get PLMN" functionality may be limited to that which is found in a regular UE. The inventors have appreciated the value of a sniffer circuit in addition to a UE module or circuit.

Alternatively, information needed equivalent to UE measurement reports may not be available from the UE circuit embedded in the base station, even if the UE circuit may be programmed to get data from multiple radio access technologies for obtaining, e.g., (E)ARFCN, but may not have a way to provide the data back to a base station application, i.e. it has a closed application programming interface or command interface. Further, the UE circuit embedded in the base station may be in use for providing backhaul connections or for mesh network links to other network nodes. The embedded UE circuit may therefore be not available for continuous monitoring. Finally, the signals transmitted by the embedded UE circuit may cause self-interference, and hence it is not suitable for receiving and transmitting on a wide range of frequencies or frequency bands. Thus, the inventors have appreciated the need for a separate RF sniffer circuit.

As mentioned above, neighbor list creation requires EARFCN functionality configured at the base station. Further, cell searching for all possible radio access technology takes many minutes, from five minutes up to about thirty to forty minutes, and may delay base station boot-up procedure. Also, for an in-vehicle base station for which the mobile environment is changing at a rapid rate due to mobility of the vehicle installed with the base station, thirty to forty minutes long cell search procedure for all available nearby cells to provide seamless mobility is not suitable. And, hence the sniffing or cell search may be executed by the base station only at the boot-up time. The in-vehicle base station may perform cell search procedure for all available nearby cells only when the vehicle is stationary for a sufficient time duration. However, a "dummy," simplified or "partial" UE embedded in the base station as disclosed here further may make it possible to perform cell search procedure in parallel and without adversely affecting the base station boot-up procedure. The present disclosure may refer synonymously to the described functionality, in some embodiments, as a dummy UE, partial UE, simplified UE, dummy UE, dummy UE module, sniffer module, sniffer circuit, or other similar nomenclature, each of which shall be understood to be distinct from a conventional UE module.

In accordance with some embodiments, the base station may include an additional dummy UE module or dummy UE, also referred to generally as a sniffer circuit or sniffer module in this disclosure, that is a receive only UE module and may perform sniffing or cell search procedure. The dummy UE may also be referred to as a partial or simplified UE. The dummy UE may, in some embodiments, consist only of the (specialized) sniffer application and the physical layer. Other layers, such as MAC, RLC, PDCP, RRC etc. may be present as needed, or not required in their entirety, or in some embodiments, required functions of those layers could reside in the sniffer application. In one embodiment, a UE protocol stack may generally have PHY, MAC layer, RLC layer, PDCP layer, RRC layer and sniffer application layer in a bottom to top order. However, the dummy UE may include PHY, MAC, RLC, and sniffer application layers. The dummy UE may not need to implement PDCP and RRC layers. The dummy UE only needs to implement the functionality associated with downlink channels, in the embodiments where it is a receive only UE. Since the dummy UE does not need to establish a radio bearer connection, the RRC layer is not required to be implemented for the dummy UE. Likewise, many of the services and functions of PDCP layer are not required by the dummy UE, e.g. transfer of user data, transfer of control plane data such as session management, bearer management, paging control, etc. Other functions or services of PDCP layer that may not be required are: in-sequence delivery of upper layer PDUs at PDCP reestablishment procedure or retransmission of PDCP SDUs at handover, etc. Therefore, the dummy UE only requires a lightweight UE protocol stack implementation that implements only lower layers of the UE protocol stack.

In accordance with some embodiments, the dummy UE may implement lightweight, partial and greatly simplified UE protocol functions for multiple radio access technology as the base station may be a multi-RAT base station. It is noted that a single-RAT base station has a need to sniff other RAT networks; for example, a 3G-only base station may have a need to determine neighboring 2G and 4G base stations for purposes of determining necessary handovers to those networks from 3G, and such a single-RAT base station may be provided with a multi-RAT sniffer, in some embodiments. The dummy UE, therefore, may implement limited UE functionality for 2G, 3G, 4G, 5G, or Wi-Fi by implementing lightweight UE protocol stack for 2G, 3G, 4G, 5G or Wi-Fi technologies respectively. In some embodiments, the multi-RAT base station software may be programmed to check for each RAT one by one. The PHY layer of each protocol stacks takes I and Q samples received at the base station antenna as an input to detect the cell signal from a nearby cells or macro base stations or macro towers.

In general, an RF switch plus a plurality of L1/PHY processing modules for a plurality of RATs may be provided, where RAT may include things like general microwave radiation, radar/DSS, etc. We can even have multiple L1/PHY modules for a single RAT. This can enable simultaneous searching for interference in a single RAT, e.g., in both Band 1 UMTS and Band 3 UMTS, for example. RF samples may be directly copied, or may be switched over CPRI, Ethernet, or another such architecture involving packetized switching of the received samples. In some embodiments, to identify which RAT is for a given signal, the multi-RAT base station software may be programmed to check for each RAT one by one; or, the I and Q samples may be sent to all or a plurality of sniffers simultaneously.

In some embodiments, a generalized implementation may add a plurality of baseband processing modules. This has the benefit of speeding up scanning by several multiples of speed. A single set of RF I/Q samples may be split and shared among a plurality of baseband processing modules. For example, a single set of I/Q samples may be received at the antenna and sent to a 2G processing module, a 3G processing module, a 4G processing module, a 5G processing module, a Wi-Fi processing module, or some combination thereof to handle radio signals of each type. Each processing module is able to decode L1/PHY signals of its respective RAT and to report signal identifying information, such as an EARFCN for the signal. As another example, a first baseband processing module may be configured to perform scanning of the 800-1800 MHz 3G frequency range and another module may be configured to scan the 1800-2100 MHz range, thereby reducing the time required to perform a full scan of selected 3G spectrum.

Any combination of modules may be contemplated, including: different RATs; same RAT, different frequency range; same RAT, same frequency range (with processing divided among the processing modules using software); etc. The modules may each have an L1 processing capability in addition to a PHY capability, each targeted to a specific RAT. Additional modules may be brought online and taken offline as needed to improve detection speed or power conservation characteristics.

To implement this, an RF switch may be placed between the antenna (ANT) and the one or more baseband processing modules. The RF switch may enable multiple copies of the signal to be split and shared. The RF switch may have capabilities matched to the coupled baseband processing modules, e.g., if the baseband processing modules perform 2G and 3G sniffing, the RF switch may be selected to handle 2G and 3G signals. In some embodiments, the I/Q samples may be digitized and packetized prior to switching, in which case a digital switch such as an Ethernet switch or CPRI switch may be used. In some embodiments, a CPRI interface or other digital packet interface for sharing the I/Q samples may be provided between the antennas and the baseband processing modules, traversing the RF switch.

The information learned from one RAT sniffing module may be shared among the other sniffing modules to increase processing speed. For example, in an embodiment where sniffing across two frequency bands are parallelized using two RF modules, the first RF module may detect an interferer in a particular band that is known to be a downlink band in the global UMTS or LTE, etc. frequency allocation scheme. The second RF module may receive this information and perform enhanced searching or accelerated searching on the known uplink band based on the known UMTS frequency allocation scheme.

In accordance with some embodiments, the dummy UE added to the base station may support functions such as "get PLMN" or "find cells on frequency x," measuring cell signal strength and signal quality, and received total (wideband) power, etc. Because the UE implements only a lightweight protocol stack, it brings the benefit of increased performance with addition of more such dummy UE sniffer circuit to the base station. The base station with more than one dummy UE may help to search all nearby cells of different technology faster and may also support increased frequency coverage. In some embodiments, the same dummy UE may be used for multiple RAT as one receive only circuit could handle multiple RATs in software through scheduling for different RAT.

Further, a cell search procedure for a 2G, 3G, and 4G LTE is discussed below. In accordance with some embodiments, the dummy UE may sniff or search for various access technology cell as programmed or scheduled by the processor. During a 4G LTE cell search procedure, a UE or a dummy UE of the base station first performs a survey to find frequencies with significant energy. It checks for power levels of different LTE bands to choose the best one with good power level. The dummy UE may look for a frequency $f$ in the middle of the energetic band with lower energy; in an LTE network, the carrier frequency does not carry data and it usually has less energy than adjacent subcarriers used for data. In some embodiments, the dummy UE may obtain center frequency f, a priori from configuration or known list EARFCN list. At this point, the dummy UE may also obtain received signal strength indicator (RSSI) information.

Further UE may perform cyclic prefix (CP) correlation to get symbol boundary information from the received I and Q signals. After the CP correlation peak has been found, the dummy UE may look for the downlink synchronization signals such as the PSS and SSS. PSS and SSS may provide many information to the dummy UE for example physical layer cell id or PCI is one among the information available based on PSS and SSS, where a division into two signals reduces the complexity of the cell search procedure. Once, a PCI information is obtained, RSRP to measure cell-specific signal strength metric may also be obtained. In a subsequent operation, the dummy UE may obtain MIB information, which is transmitted on the PBCH and provides information such as system bandwidth, system frame number, number of antennas at the macro base station, PHICH duration and resource type. The dummy UE may also decode SIB information to receive SIB1, and SIB2 carrying carrier specific eNodeB information such as PLMN ID, TDD DL-UL config and special subframe type information, PRACH opportunity window, PUCCH formats, etc. With the knowledge of PLMN ID and PCI, evolved cell global identifier (ECGI) may also be calculated or extracted by the dummy UE. The dummy UE may therefor determine that the other UE may connect to the macro base station instead of the in-vehicle base station embedded with the dummy UE and access the core network and services offered by the core network. The in-vehicle base station may therefore turn off access side functionality to force the UEs to connect to the macro base station or may perform handover of the UEs connected to the in-vehicle base station.

In accordance with some embodiments, in a 3G base station, the dummy UE may perform cell search procedure as described below. Similar to 4G LTE cell search procedure, in a 3G cell search procedure, the dummy UE performs survey to find frequencies (sub-bands) with distinctive power. The dummy UE may look for a frequency $f$ in the middle of the energetic band with higher or peak power. In some embodiments, the dummy UE may obtain a center frequency $f$, a priori from configuration or known list of EARFCN list. At this point, the dummy UE may also obtain received signal strength indicator (RSSI) information. In some embodiments, the dummy UE may perform measurements on all the frequency bands. In some embodiments, the dummy UE may perform measurements for a specific set of frequency channels only.

In accordance with some embodiments, the dummy UE may next obtain synchronization signals, primary and secondary SCH signals transmitted by the neighboring 3G cell. The primary SCH (PSCH) contains same data sequence (CP) and repeats the same code frequency over every slots and helps to find slot boundary. The secondary SCH (SSCH) repeat over 15 different code sequences (over a frame) and may be used to find the frame boundary and repeat sequence. The determined repeat sequence of SSCH indicates the primary scrambling code group of the sector to descramble CPICH. The downlink scrambling codes are divided into 512 sets, and each set consists of a primary scrambling code and 15 secondary scrambling codes. The 512 primaries are further divided into 64 scrambling code groups, each group consisting of 8 primary scrambling codes. The 64 groups have a one-to-one mapping to the sequence of secondary synchronization codes. Each cell is allocated only one primary scrambling code, and PCPICH may be used to obtain received signal code power (PCPICH-RSCP). In some embodiments, the dummy UE may also continue to perform cell search procedure to obtain broadcast channel (BCH), identify network and cell, collect measurement reports and identify active energy band. Upon detection of nearby 3G cell where a UE can connect to, the dummy UE may therefore provide the data to a higher-layer managing unit ("CWS manager" or SON) of the in-vehicle base station, which may decide to turn off access side functionality, thereby forcing the UEs to connect to the macro base station or, prior to switching off, hand the UEs connected to the in-vehicle base station over to a macro base station.

In some embodiments, 2G cell search as well as 3G and 4G cell search may be provided. In accordance with some embodiments, a dummy UE may perform 2G cell search by searching for broadcast control channel (BCCH) frequency list. The BCCH frequency list may be stored in the memory or as a configuration file. The list may be limited to 32 BCCH frequencies or it may be the whole frequency band. In some embodiments, the dummy UE may search the entire frequency band for the strongest BCCH carrier. In some embodiments, the BCCH frequency list, also known as BCCH allocation (BA), may be of two types, active and idle. In accordance with some embodiments, entire frequency band is scanned for the signal strength, and may store the frequencies detected based on the signal strength detected. Next, synchronization channel (SCH) information may be obtained as the dummy UE tunes to the BCCH carrier and also derives information such as cell global identity (CGI), location area identity (LAI), etc. Upon detection of nearby 2G cell where a UE can connect to, the dummy UE may therefore cause the in-vehicle base station to turn off access side functionality to force the UEs to connect to the macro base station or may perform handover of the UEs connected to the in-vehicle base station to a macro base station in a 2G cell.

In some embodiments, when the in-vehicle base station turns off its access side functionality, it results in no interference with other macro base station, other in-vehicle base stations. In the case that the dummy UE is a receive only and does not transmit, it also avoids self-interference. As a dummy UE may be embedded in the base station or in-vehicle base station, no attachment to base station is required and no bearer resources are needed to be allocated or created. In such embodiments, the dummy UE is further not dependent on the PHY layer of the base station and also does not have to limit its radio access technology to UE's PHY layer.

In some embodiments, the processor of the base station may schedule or program the dummy UE to perform asynchronously of the other RXTX of the base stations. An ability to operate dummy UE asynchronously offers the benefit of avoiding delay at the base station's power on time. As mentioned above, the dummy UE may be multi-RAT and may support 2G, 3G, 4G, 5G, and Wi-Fi or similar access technology. Also, the dummy UE may scan the entire frequency spectrum for the particular RAT or may be configured to scan selected frequencies for faster operation. Thus, the dummy UE may be used without EARFCN and may measure any network. However, the person skilled in the art may recognize that in embodiments where the antenna is not tuned or optimized for any particular frequency, some modeling of the received signal may be required for correct determination.

In accordance with some embodiments, the dummy UE as disclosed above may scan the entire frequency spectrum for 2G, 3G, 4G, or 5G access technology, and upon detection of carrier frequency band to which the UE may connect to get the services from the core network, the dummy UE send a signal and other related information to the base station or other in-vehicle base station to turn off access side. Thus, the dummy UE performs channel switching while scanning the spectrum, but the channel switching is performed to scan the available carrier frequency bands. In some embodiments, the base station may be installed in a vehicle and hence may be mobile. Such in-vehicle base station may use channel switching to find neighbor cells around it and may also report the detected neighbor cells to the coordinating server. The coordinating server may therefore build the automatic neighbor relation table that also includes the base stations or macro base stations not managed by the coordinating server. As the dummy UE embedded in the in-vehicle base station performs channel switching to scan the frequency spectrum, it may also detect PLMN or EARFCN or other interfering base stations or eNodeBs in any radio access technology such as 2G, 3G, 4G, 5G, etc.

In accordance with some embodiments, the algorithms for 2G, 3G, 4G, 5G, or other RAT may speed up the scanning of the entire frequency spectrum by first mapping energy in all frequencies before focusing on carrier frequencies specifically. Also, the scanning of the frequency spectrum may be made faster as the dummy UE may look for specific signals from known nearby macros based on the GPS coordinates of the in-vehicle base station and information about known macro base stations surrounding the in-vehicle base station at that geographic location as received from the coordinating server. In some embodiments, the base station may also store the information about surrounding macros associated with GPS coordinates and a timestamp and may be stored in a database, where the database may be located either at the base station or at the coordinating server. The energy map may be made more useful using the RF switching and multi-PHY architecture described herein.

In accordance with some embodiments, the dummy UE may continuously and asynchronously scan or sniff for the available signal from a network of macro base stations. Since the dummy UE is receive only and separate from other UE circuits available at the base station, continuous and asynchronous scanning is possible. Also, the dummy UE may provide the information about each neighbor cell and its radio access technology, radio power to the coordinating server and its SON module over the interface between the coordinating server and the in-vehicle base station housing the dummy UE. The dummy UE may provide the information to the coordinating server or the processor of the base station housing the dummy UE periodically or upon change in detected signal. The coordinating server and its SON module may therefore coordinate with other base stations that are managed by the coordinating server and instruct the other base stations to turn off the cell or to switch to a different radio access technology. As described above, the in-vehicle base station may send data collected by its various modules including the dummy UE to the coordinating server for asynchronous analysis. The data sent by the in-vehicle base station may also include baseband data or detected EARFCN data.

In accordance with some embodiments, the dummy UE of the in-vehicle base station, which may be a receive only circuit and does not transmit, may also reduce self-interference as described here. The dummy UE may use software defined radio and digitally tune to the macro frequencies and filter out its own base station signal. Further efficiency may be obtained by tuning the software defined to receive and detect from a specific list of frequency bands or channels only from the set of global UMTS transmission bands. As the dummy UE detects signal from a macro base station or a cell tower, the dummy UE causes the in-vehicle base station to turn off coverage. While the coverage is turned off as long as the dummy UE detects the signal from the macro base station, it reduces the interference with other macro base stations and nearby in-vehicle base stations. However, the in-vehicle base station may be able to communicate with other eNodeBs or base stations in the network via mesh network link as needed. In some embodiments, the dummy UE may cause the in-vehicle base station to adjust its transmission power based on the signal strength from nearby cells and detected interferers. In some embodiments, the turning on and off the in-vehicle base station's coverage may depend on the speed of the vehicle, battery level of the vehicle, vehicle engine's start and stop condition.

The general principle herein is that the PHY is always going to be in use for any UE or RX/TX circuit. To make the PHY available for use by a sniffer, we may merely add an additional PHY, plus an RF switch to connect the received I and Q samples from the existing antenna to both the RX/TX or UE PHY and to the sniffing PHY. If a PHY is to be used only for sniffing, we need only a partial PHY and L1, providing some subset of network processing, such as, e.g., cell search capability.

In some embodiments, involving multiple scanning or sniffing frequency bands, RF filtering and antenna processing needs may be different for different frequencies. In this case the base station may also provide multiple antennas and/or filters. A single filter may be provided that is software tunable, or multiple filters coupled with antennas may be provided with RF switching between them in software, for use by multiple scanning modules, thereby enabling limited software-based tunability.

Advantages of the present application include the following. Less processing load may be required on the UE since it is not required to scan. An integrated UE backhaul module of the base station may not be required to perform scanning and may therefore be available for backhaul or other functions. Multiple L1/PHY modules may provide parallelized processing of the RF samples to enable rapid scanning. In addition, in some embodiments involving parallelized RF processing of I and Q samples, processing of the I and Q samples may be performed locally, which enables real-time or near-real time detection of interference that would otherwise be difficult to accomplish were the I and Q samples being sent off-device to a cloud device to be processed.

In some embodiments, the phrase "dummy UE" may be used to describe one or more of these L1/PHY RF processing modules.

Figures

FIG. 1 is an exemplary network diagram showing in-vehicle base station in a cellular radio access network, in accordance with some embodiments. As shown, macro base stations 102, 103, 104, and 105 provides access to a core network 107 and its services including internet services 108. A coordinating 106 may or may not be managing the macro base stations 102, 103, 104 or 105. The macro base stations 102, 103, 104 or 105 if managed by the coordinating server 106 may provide access to the core network 107 via connection to the coordinating server 106 (not shown in the figure). The emergency vehicle 109 or any vehicle such as a bus, train, public transport system may be installed with a base station 101 or an in-vehicle base station 101. A user equipment (UE) 110 may be connected to the in-vehicle base station 101. The in-vehicle base station 101 may provide access to a user equipment (UE) 110 to the core network 107 and its services including internet services 108. As the emergency vehicle 109 approaches an area having good cellular coverage provided by either of the macro base stations 102, 103, 104, or 105, the in-vehicle base station 101 may cause signal interference and may interrupt the coverage at the UE 110.

Figure 2:
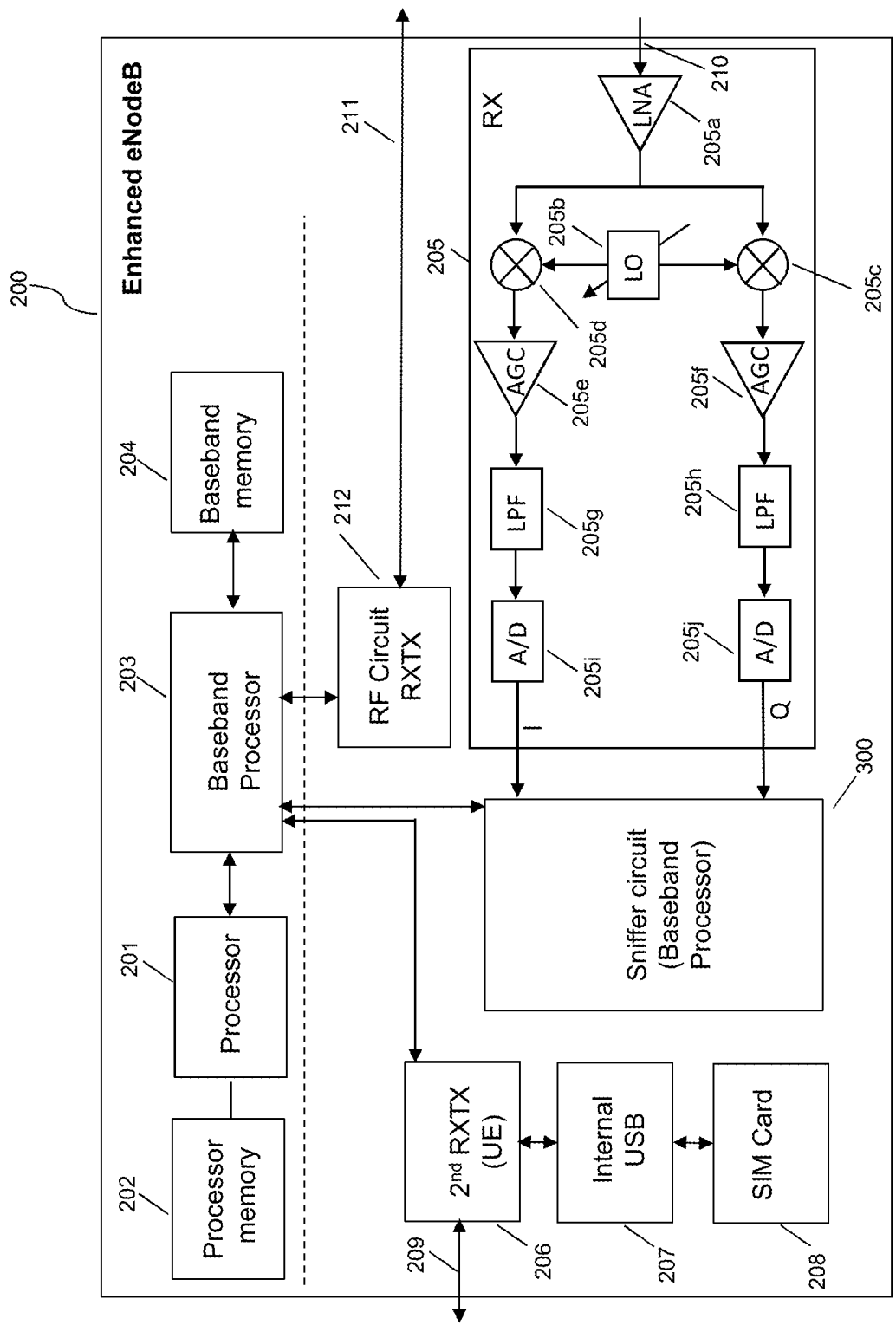
FIG. 2 is a block diagram of an exemplary in-vehicle base station, in accordance with some embodiments.

FIG. 2 is a block diagram of an exemplary in-vehicle base station, in accordance with some embodiments. An exemplary in-vehicle base station 200 or eNodeB 200 may include processor 201, processor memory 202 in communication with the processor 201, baseband processor 203, and baseband processor memory 204 in communication with the baseband processor 203. The eNodeB 200 may also include first radio transceiver 205 and second radio transceiver 206, internal universal serial bus (USB) port 207, and subscriber information module card (SIM card) 208 coupled to USB port 207. In some embodiments, the second radio transceiver 206 itself may be coupled to USB port 207, and communications from the baseband processor may be passed through USB port 207. The second radio transceiver may be used for wirelessly backhauling eNodeB 200.

Processor 201 and baseband processor 203 are in communication with one another. Processor 201 may perform routing functions, and may determine if/when a switch in network configuration is needed. Baseband processor 203 may generate and receive radio signals for both radio transceivers 205 and 206, based on instructions from processor 201. In some embodiments, processors 201 and 203 may be on the same physical logic board. In other embodiments, they may be on separate logic boards.

Processor 201 may identify the appropriate network configuration, and may perform routing of packets from one network interface to another accordingly. Processor 201 may use memory 202, in particular to store a routing table to be used for routing packets. Baseband processor 203 may perform operations to generate the radio frequency signals for transmission or retransmission by both transceivers 205 and 206. Baseband processor 203 may also perform operations to decode signals received by transceivers 205 and 206. Baseband processor 203 may use memory 204 to perform these tasks.

The first radio transceiver 212 may be a radio transceiver capable of providing LTE eNodeB functionality and may be capable of higher power and multi-channel OFDMA. The first radio transceiver 205 may be a radio transceiver capable of providing LTE eNodeB functionality and may be capable of higher power and multi-channel OFDMA. The first radio transceiver 212 may also be referred as a base station access radio in this disclosure. The second radio transceiver 206 may be a radio transceiver capable of providing LTE UE functionality and may also be referred to as a user equipment module. Both transceivers 212 and 206 may be capable of receiving and transmitting on one or more LTE bands. In some embodiments, either or both of transceivers 212 and 206 may be capable of providing both LTE eNodeB and LTE UE functionality. Shown in the FIG. 5, a RF receiver circuit 205 coupled to processor 201 via a Peripheral Component Interconnect-Express (PCI-E) bus, and/or via a daughter-card. As transceiver 206 is for providing LTE UE functionality, in effect emulating a user equipment, it may be connected via the same or different PCI-E bus, or by a USB bus, and may also be coupled to SIM card 208. First transceiver 212 may be coupled to first radio frequency (RF) chain (filter, amplifier, antenna) 211 (components not shown in the figure), and second transceiver 206 may be coupled to second RF chain (filter, amplifier, antenna) 209 (components not shown in the figure). In some embodiments, components of the RF chain may be shared by a plurality of transceivers, receivers, and/or transmitters.

SIM card 208 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or another parameter needed to identify a UE. Special parameters may also be stored in the SIM card or provided by the processor during processing to identify to a target eNodeB that device 200 is not an ordinary UE but instead is a special UE for providing backhaul to device 200.

The RF receiver 205 is further disclosed in accordance with some embodiments. The RF receiver 205 may contain components for I and Q demodulation from the radio frequency input received at antenna. The components shown are exemplary and person skilled in the art may recognize other variation of it. The eNodeB 200 includes a dummy UE 300 or a sniffer circuit 300. In some embodiments, the eNodeB 200 may include a plurality of dummy UE 300. In some embodiments, each sniffer circuit may support a single radio access technology, e.g., 2G, 3G, 4G, or 5G, etc. In some embodiments, the sniffer circuit may support multiple radio access technologies. In some embodiments, the sniffer circuit 300 may be coupled to the RF receiver via a bus. The dummy UE 300, in some embodiments, may be a receive only circuit and takes as input I and Q signal after demodulation of received RF at the antenna interface 210. A low noise amplifier (LNA) 205a amplifies a low-powered radio frequency signal. The LNA 205a may amplify the signal without significantly degrading the signal-to-noise ratio (SNR). A local oscillator 205b may provide input with 90-degree phase difference to mixers 205c and 205d. The output signal of 205c and 205d processed through automatic gain control circuit 205e and 205f and low pass filter circuits 205g and 205h. The filtered and amplified signal may next be processed through analog to digital conversion via 205i and 205j and fed as input to the dummy UE 300. The dummy UE 300 as described above in the description may detect nearby neighbor cells. The baseband processor 203 or the processor 201 processes the signals received at the transceiver 205 and also perform scheduling of the signal processing at sniffer circuit 300. While the components shown here for I and Q demodulation are exemplary only, and hence other variations such as implementing the same on a chip, field programmable gate array (FPGA), baseband processor, etc., may also be possible.

In some embodiments, the dummy UE 300 may be a hardware plug-in module with its own baseband processor, the independent baseband processor enabled to provide sniffing a particular radio access technology e.g., 2G, 3G, 4G, or 5G, etc. In some embodiments, the plurality of sniffer circuits may operate in parallel over multiple frequency bands for a single or different RAT. Depending on the frequency spectrum to be scanned by the dummy UE, wideband frequency filter and wideband frequency power amplifier components may also be included. In some embodiments, the sniffer circuit 300 may be protocol-aware and may connect to a network at least at layer 2 (L2) and potentially at layer 3 (L3) without registering itself as a user equipment (UE) on the core network. In some embodiments, the dummy UE 300 may include a baseband processor and a radio in a pluggable module form factor; in some embodiments the dummy UE may include a baseband processor with no radio.

Wired backhaul, or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 805 and 806, which may be Wi-Fi 802.11a/b/g/n/ac/ad/ah, Bluetooth, ZigBee, microwave (including line-of-sight microwave), 5G fixed wireless, or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 802 for reconfiguration.

A GPS module (not shown in the figure) may also be included in the eNodeB 200, and may be in communication with a GPS antenna (not shown in the figure) for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module (not shown in the figure) may also be present and may run on processor 201 or on another processor, or may be located within another device e.g. a coordinating server 106, according to the methods and procedures described herein.

Figure 3:
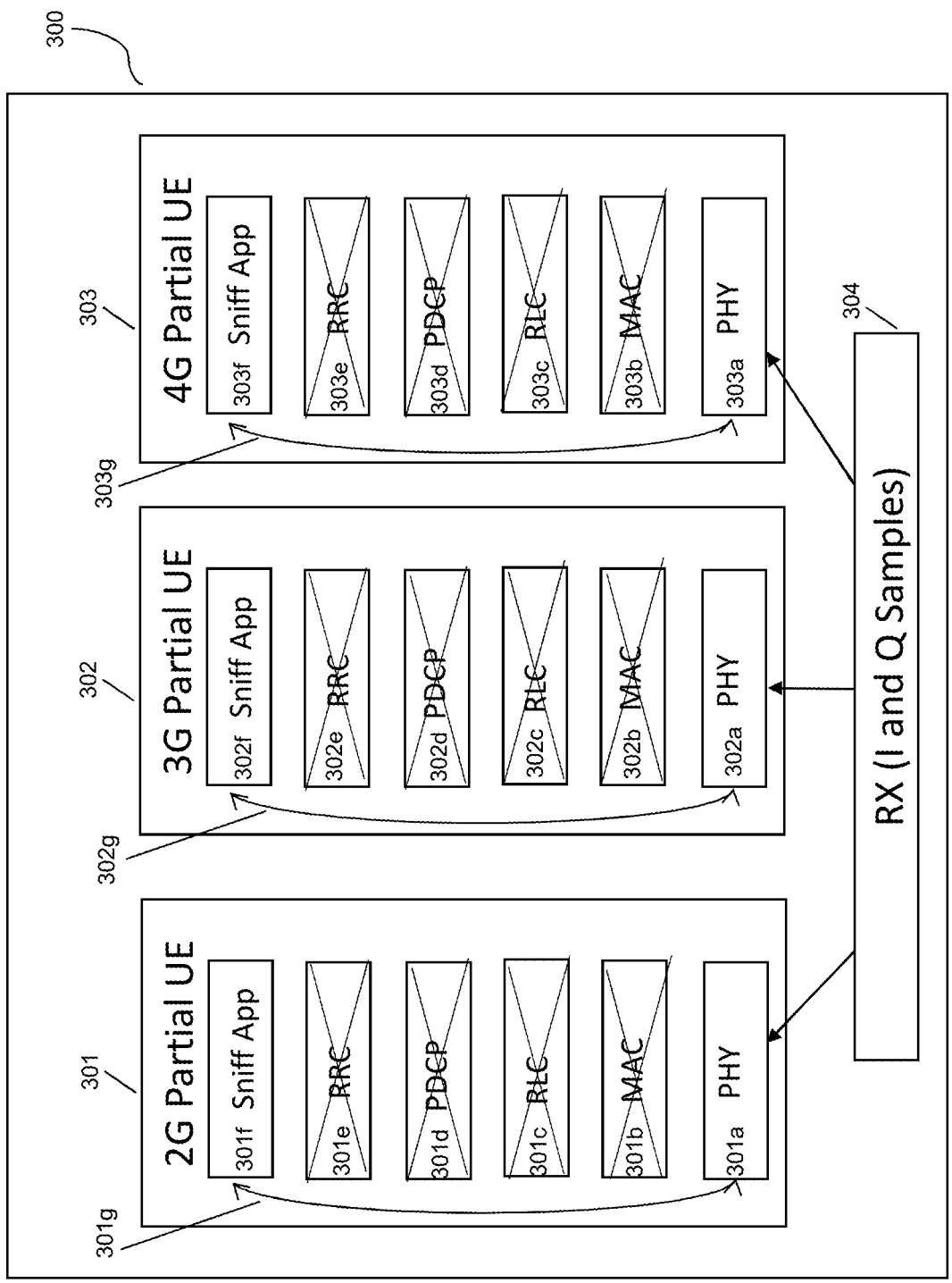
FIG. 3 is a block diagram of an exemplary sniffer circuit of the exemplary in-vehicle base station, in accordance with some embodiments.

FIG. 3 is a block diagram of an exemplary sniffer circuit of the exemplary in-vehicle base station, in accordance with some embodiments. As described above the dummy UE 300 or sniffer circuit 300 is embedded in the eNodeB 200. The dummy UE 300 implements partial UE functionality and may have partial UE stack for different radio access technology such as 2G, 3G, 4G, and 5G. In the figure, 2G partial UE stack 301, 3G partial UE stack 302, and 4G partial UE stack 303 are shown. 5G partial UE stack is not shown in the figure. As described in this disclosure, not all protocol layers are required to be implemented by the dummy UE 300 since the dummy UE 300 only implements partial UE functionality and do not perform outbound transmit function or does not attach to a base station. As shown in the FIG. 3, 2G partial UE 301, 3G partial UE 302, and 4G partial UE 303 may implement layer 1 or PHY layer 301a, 302a, and 303a respectively. Similarly, layer 2 or MAC layer 301b, 302b, and 303b and layer 3 or RRC layer 301c, 302c, and 303c may be implemented by 2G partial UE 301, 3G partial UE 302, and 4G partial UE 303 respectively. However, since only lightweight UE protocol stack is implemented by the dummy UE 300, PDCP layer 301d, 302d, and 303d, and RRC layer 301e, 302e, and 303e may be excluded from implementation.

In accordance with some embodiments, each partial UE protocol stack 301, 302, and 303 may also have an application layer, for example sniffer application 301f, 302f, and 303f. The sniffer application 301f, 302f, and 303f, may communicate to the processor 201 or the baseband processor 203 for reporting of the detected neighbor cells, measurement reports, detected interference and interferers, etc. to the eNodeB 200 or the coordinating server 106. The sniffer application 301f, 302f, and 303f may also send signal to the processor 201 or the baseband processor 203 to turn off radio coverage to avoid interference with the neighbor cells or adjust the transmit power at the transceivers 205 and 206 to avoid interference with the neighbor cells. In some embodiments, the eNodeB 200 may receive instructions from the coordinating server to turn off coverage or adjust transmit power at the transceivers 205 and 206. As described before, PHY layers 301a, 302a, and 303a receives I and Q signal samples 304 from the transceiver 205. The processor 201 or the baseband processor 203 may schedule detection of various radio access technology such as 2G, 3G, 4G, and 5G in a scheduled round robin order.

In some embodiments, the dummy UE may consist only of the (specialized) sniffer application (301f, 302f, and 303f) and the physical layer (301a, 302a, and 303a). In some embodiments, other layers, such as MAC (301b, 302b, and 303b), RLC (301c, 302c, and 303c), PDCP (301d, 302d, and 303d), RRC (301e, 302e, and 303e) etc. may be present as needed, or not required in their entirety, or in some embodiments, required functions of those layers could reside in the sniffer application. For example, only the PHY layer could be provided, in some embodiments. A proprietary interface 301g, 302g, and 303g may allow sniffer application (301f, 302f, and 303f) to communicate with the PHY layer (301a, 302, and 303a). The sniffer application may request cell search or measurement report via the proprietary interface (301g, 302g, and 303g). The PHY layer (301a, 302a, and 303a) may report detected cell related information and measurement reports to the sniffer application (301f, 302f, and 303f) via the proprietary interface (301g, 302g, and 303g). In some embodiments, the proprietary interface may be implemented between the sniffer application and a layer other than the PHY layer, such as MAC, RLC, etc.

Figure 4:
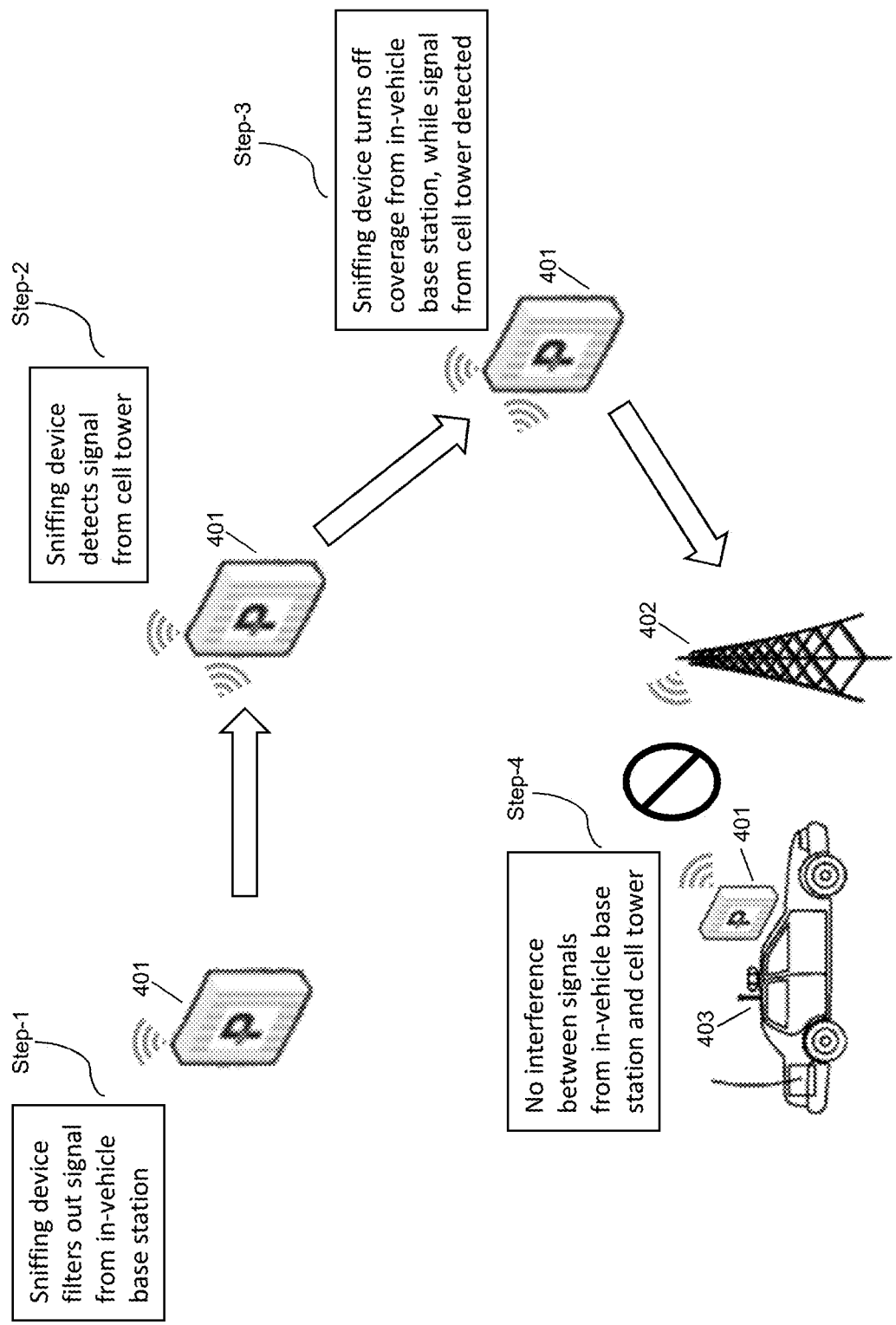
FIG. 4 is a flow chart, in accordance with some embodiments.

FIG. 4 is a flow chart, in accordance with some embodiments. At step 1, an eNodeB 401 installed in an emergency or other vehicle 403 and the eNodeB 401 having the dummy UE 300 embedded in 401 filters out the signals transmitted by the eNodeB 401 itself. At step 2, the dummy circuit 300 of the eNodeB 401 detects signal from nearby cell or macro base station. At step 3, the eNodeB 401 turns off coverage either on its own or upon instruction from the coordinating server 106. Since the eNodeB 401 turns off coverage, the user equipments connected to the eNodeB 401 for access to the core network 107 may establish a new radio connection to the macro base station detected by the eNodeB 401. The eNodeB 401 may also perform handover of the UEs connected to 401 to the detected macro base station before turning off coverage. At step 4, since the eNodeB 401 turns off coverage, there is no interference between signal from the eNodeB 401 and the macro base station (not shown in the figure). As the emergency vehicle 403 moves to a different area and does not detect signal from macro base station any more, the eNodeB may turn on coverage to provide access to nearby user equipments to the core network as the nearby user equipments connects to the eNodeB 401.

Figure 5:
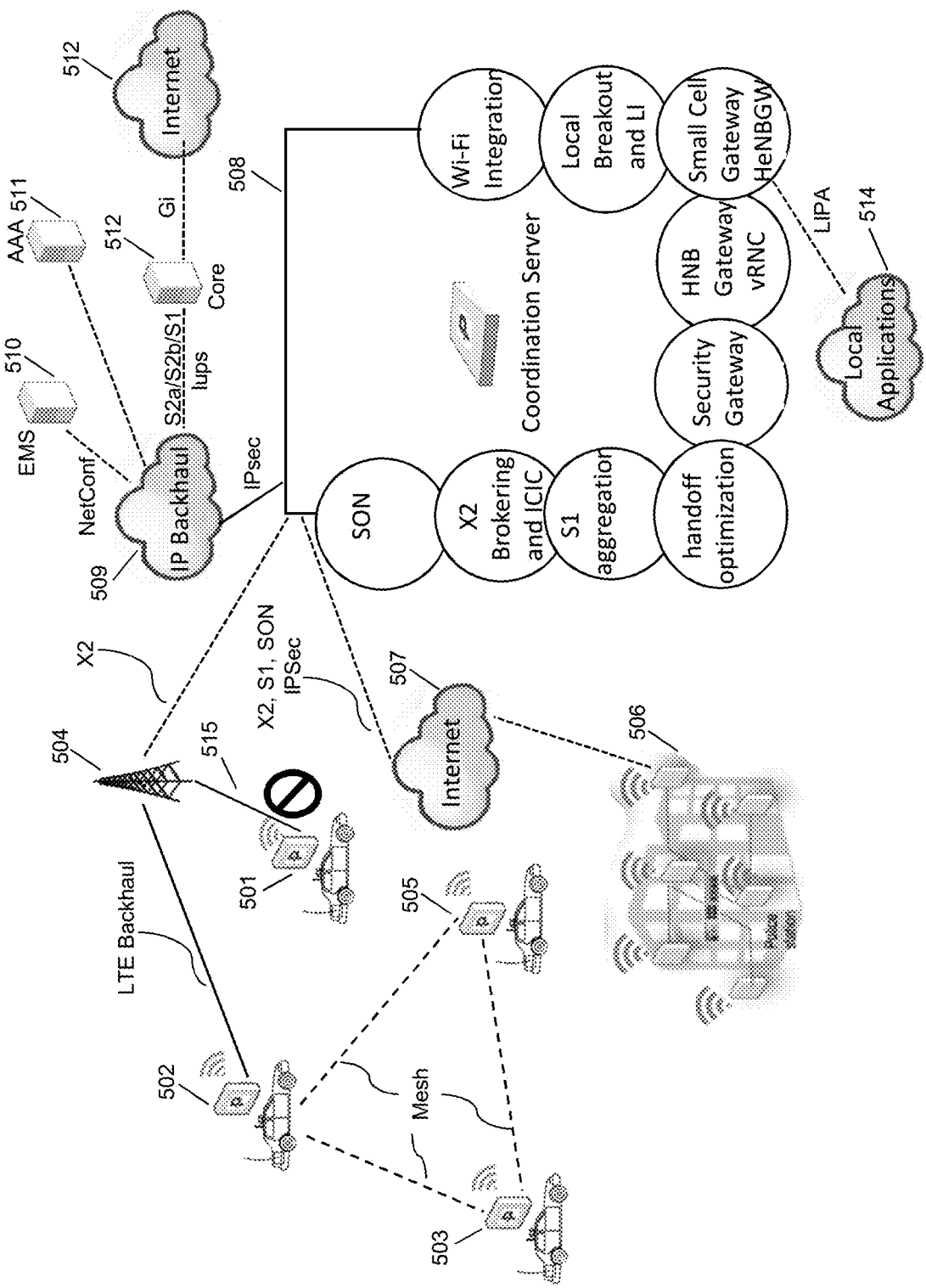
FIG. 5 is an exemplary network diagram, in accordance with some embodiments.

FIG. 5 is an exemplary network diagram, in accordance with some embodiments. In-vehicle base stations 501, 502, 503, and 505 may be installed in an emergency vehicle. The in-vehicle base station may also be installed in other type of vehicles such as public transport system, etc. The in-vehicle base stations 502, 503 and 505 form a mesh network and connected by mesh network link. The in-vehicle base station 502 may further provide access to the core network 512 via macro base station 504. The in-vehicle base station 502 is a gateway mesh node in the exemplary network diagram shown in FIG. 5. The macro base station 504 and the in-vehicle base station 501, 502, 503, and 505 may be managed by a coordinating server 508 or a coordination server 508. The coordination server 508 offers features such as SON, X2 brokering and inter-cell interference cancellation (ICIC), 51 aggregator. The coordinating server 508 may also perform handoff based on signal strength report received from the base station or UE measurement reports, and therefore handoff optimization. As can be seen in the FIG. 5 and also FIG. 1, the coordination server 508 or 106 may act as gateway between radio access network of base stations, nodeBs, eNodeBs, macro base stations etc. and the mobile operator's core network 512 or 107. The coordinating server 507 may be connected to the core network components, for example element management system 510 over NetConf interface or AAA server 511. The core network may further provide internet service 512 over Gi interface. Many other base stations that are fixed and shown as 506 may be connected to the coordinating server 508 over S1, X2, or SON interface established over IPsec tunnel. As the in-vehicle base station 501 reaches the coverage area of macro base station 504, it causes interference due to the signal transmission from both 501 and 504. However, the dummy circuit UE 300 in the in-vehicle base station 501 may turn off coverage upon detection of signal from macro base station 504, and therefore may avoid interference with 504. In some embodiments, coverage may be increased or decreased at the base station to mitigate interference, e.g., increasing signal strength to overpower interferers, or decreasing signal strength to avoid becoming an interferer, up to and including turning a signal on or off completely.

Figure 6:
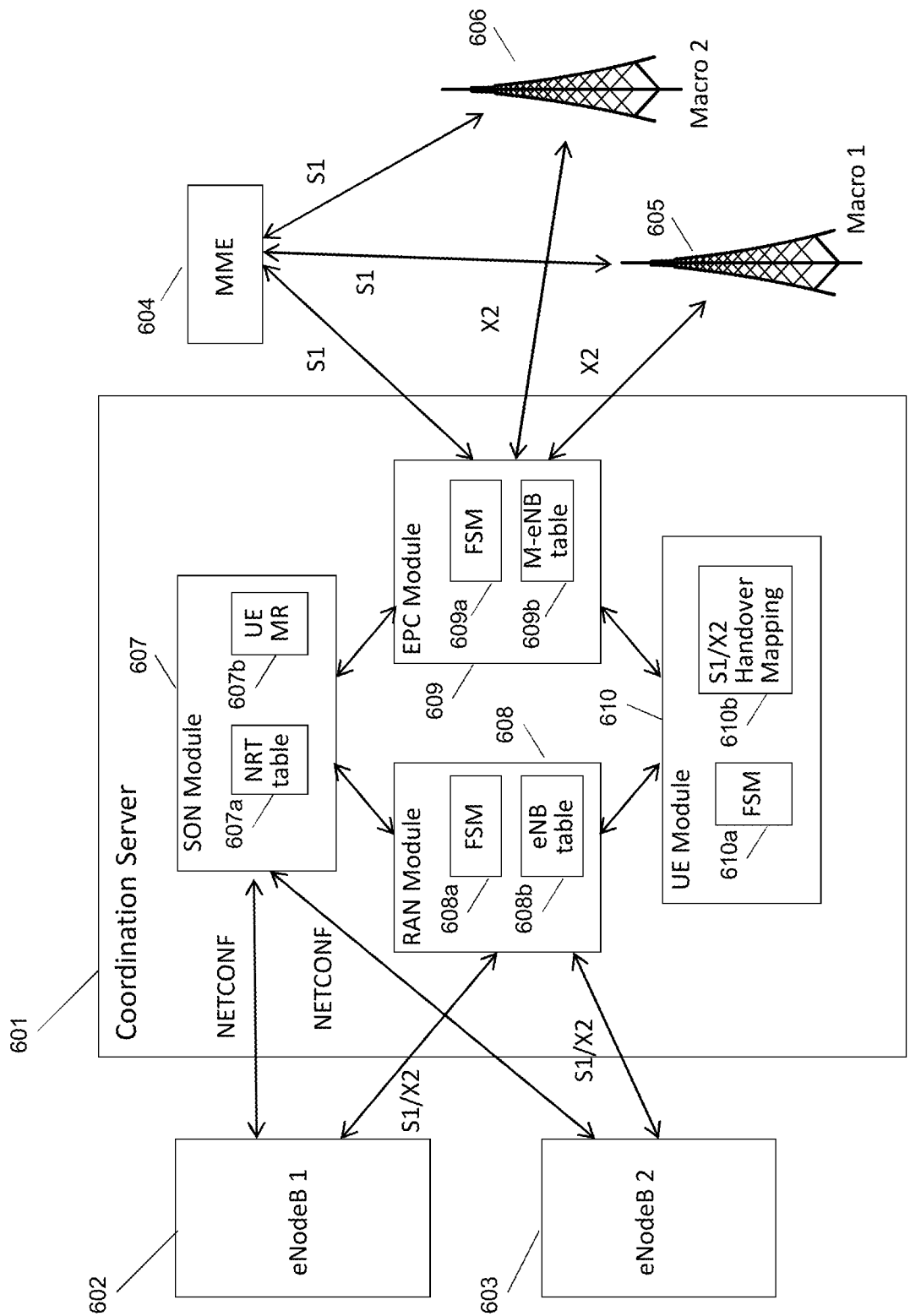
FIG. 6 is a block diagram of a coordination server, in accordance with some embodiments.

FIG. 6 is a schematic diagram of a coordinating server in a Long Term Evolution (LTE) architecture, in accordance with some embodiments. Coordinating server 601, also may be referred as a gateway in this disclosure, provides services to, and is coupled to, eNodeB 1 602 and eNodeB 2 603, on a RAN side of a network (i.e., inside of the gateway). Coordinating server 601 provides services to, and is coupled to, MME 604, macro eNodeB 605, and macro eNodeB 606, on a core network side of the network (outside of the gateway). The eNodeB 1 602 or the eNodeB 2 603 may be in-vehicle base station and may also include dummy UE 300 described earlier.

Within coordinating server 601 are self-organizing network (SON) module 607, containing neighbor relation table (NRT) 607a and UE measurement report processing module 607b; evolved packet core (EPC) module 609, containing EPC finite state machine module 609a and macro eNodeB table 609b; radio access network (RAN) module 608, containing eNodeB finite state machine module 608a and eNodeB table 608b; and user equipment (UE) module 610, containing UE finite state machine module 610a and S1/X2 handover mapping table 610b. Each of modules 607, 608, 609, and 610 are coupled to each other within coordinating server 601, and may execute on one or more shared processors (not shown) coupled with memory (not shown).

In some embodiments, SON module 607 may perform NRT maintenance, load information processing and fractional frequency reuse (FFR) processing; RAN module 608 may perform X2 association management with eNodeBs 602, 603; EPC module 609 may perform X2 association management with macro eNodeBs 605, 606; and UE module may perform X2 handover and S1/X2 translation between eNodeBs 602, 603 and macro eNodeBs 605, 606. All the above managers/modules interact with each other to accomplish the assigned functionality.

Alternatives

While the solution described here is using a coordinating server, one skilled in the art may recognize and appreciate that the method disclosed here may be applied at the other network elements such as a cloud computing server, where many of the digital signal data may be sent as a raw data to the cloud computing server for further processing for an additional benefit of low cost and faster eNodeB or base station.

The above-described features and applications can be implemented as software processes that are specified as a set of instructions recorded on a computer-readable storage medium (also referred to as computer readable medium). When these instructions are executed by one or more processing unit(s) (e.g. one or more processors, cores of processors, or other processing units), they cause the processing unit(s) to perform the actions indicated in the instructions. Examples of computer readable media include, but are not limited to, CD-ROMs, flash drives, hard drives, RAM chips, EPROMs, etc. The computer-readable media does not include carrier waves and electronic signals passing wirelessly or wired connections.

In the specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronics systems, define one or more specific machine implementations that execute and perform the operations of the software programs.

A computer program (also known as program, software, software application, script, or code) can be written in any form of programming language, including compiled or interpreted languages, declarative or procedural languages, and it can be deployed in any form, including as a standalone program or as a module, component, subroutine, object, or another unit suitable for use in a computing environment. A computer program may, but need not correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

These functions described above can be implemented in digital electronic circuitry, in computer software, hardware, or firmware. The techniques can be implemented using one or more computer program products. Programmable processors and computers can be included in or packaged as mobile devices. The process and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), readable compact discs (CD-R), rewritable compact discs (CD-RW), read-only digital versatile discs (e.g., DVD-ROM, dual-layer DVD-ROM), a variety of recordable/rewritable DVDs (e.g. DVD-RAM, DVD-RW, DVD+RW, etc.), flash memory (e.g., SD cards, mini-SD cards, micro-SD cards, etc.), magnetic or solid-state hard drives, read-only and recordable Blu-Ray® discs, ultra-density optical discs, any other optical or magnetic media, and floppy disks. The computer-readable media can store a computer program that is executed by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored in the circuit itself. A general purpose processor could be used where a baseband processor is described, for example for low-complexity RATs such as 2G, or vice versa, in some embodiments; a single processor with both general purpose and baseband processing capability could be used. Multiple processors or multiple cores of a single processor, or both, could be used. Data could be shared via an internal Ethernet or packet switch, or via an internal bus architecture. One or more radios could be used, where multiple radios could be used to support multiple RATs, in some embodiments, and where each radio could be specially configured to the specific RAT.

As used in this specification and any claims of this application, the terms "computer", "server", "processor", and "memory" all refer to electronic or other technological devices. These terms exclude people or groups of people. For the purpose of the specification, the terms display or displaying means displaying on an electronic device. As used in this specification and any claims of this application, the terms "computer-readable media" and "computer readable medium" are entirely restricted to tangible, physical objects that store information in a form that is readable by a computer. These terms exclude any wireless, wired download signals, and any other ephemeral signals.

To provide for interaction with a user, implementations of the subject matter described in this specification can be implemented on a device having a display, e.g., a CRT (cathode ray tube) or LCD (liquid crystal display) monitor, or any other available monitor types, for displaying information to the user and a keyboard and a pointing device, e.g., touchpad, touch screen ,mouse or trackball, by which the user can provide input to the computer. Other kinds of devices can be used to provide for interaction with a user as well; for example, feedback provided to the user can be any form of sensory feedback, e.g., visual feedback, tactile feedback, or auditory feedback; and input from the user can be received in any form, including acoustic, speech, or tactile input. In addition, a device can interact with a user by sending documents to and receiving documents from a device that is used by the user; for example, by sending web pages to a web browser on a user's client device in response to requests received from the web browser.

The subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication network include a local area network ("LAN"), an inter-network (e.g., the Internet), and peer-to-peer networks (e.g., ad-hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purpose of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and system can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in singular is not intended to mean "one and only one" unless specifically so states, but rather "one or more." Unless expressly stated otherwise, the term "some" refers to one or more. Pronouns in the masculine (e.g., his) include the feminine and neuter gender (e.g., her and its) and vice versa. Headings and subheadings, if any, are used for convenience only, and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations or one or more configurations. A phrase, for example, a configuration may refer to one or more configurations and vice versa.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Accordingly, the disclosure of the present invention is intended to be illustrative of, but not limiting of, the scope of the invention, which is specified in the following claims.

The invention claimed is:

1. A base station, comprising:
   a processor;
   a memory coupled to the processor;
   a base station access radio coupled to the processor;
   a user equipment module, coupled to the processor, for providing a backhaul link for the base station; and
   a sniffer circuit coupled to the processor, wherein the sniffer circuit further comprises:
   a PHY processing layer for receiving in-phase and quadrature samples from a radio receive chain;
   at least two radio access technology (RAT)-specific layer 1/physical layer (L1/PHY) processing modules supporting at least two of 2G, 3G, 4G, Wi-Fi, WiMax, or 5G radio access technologies, for receiving the in-phase and quadrature samples from the PHY processing layer and for performing RAT-specific processing on the received samples; and
   wherein the base station is a mobile base station providing access in a moving vehicle, the base station being configured to detect nearby radio frequency sources using the sniffer circuit, the base station being configured to turn itself on and off to avoid interference with other base stations in proximity of the vehicle and wherein the sniffer circuit is turned off or on based on a vehicle ignition status.

2. The base station of claim 1, wherein the sniffer circuit is enabled to operate continuously and asynchronously and to report status to the processor periodically or based on a change in a monitored signal.

3. The base station of claim 1, wherein the sniffer circuit is coupled to a wideband radio frequency filter.

4. The base station of claim 1, wherein the sniffer circuit is coupled to a wideband radio frequency power amplifier.

5. The base station of claim 1, wherein the sniffer circuit is coupled to a software-defined radio and is configured to retune the software-defined radio to receive signals in specific frequency bands, and wherein the specific frequency bands are selected from the set of global UMTS transmission bands.

6. The base station of claim 1, wherein the sniffer circuit is configured to receive samples and process the samples using a CDMA algorithm, an OFDM algorithm, or a TDMA algorithm, sequentially or in parallel, thereby determining a signal type of the received samples.

7. The base station of claim 1, wherein the sniffer circuit is configured to extract one or more of EARFCN, signal strength, Public Land Mobile Network Identifier (PLMN ID), Physical Cell Identifier (PCI), E-UTRAN Cell Global Identifier (ECGI), or other information found in typical UE measurement reports.

8. The base station of claim 1, wherein the sniffer circuit is configured to identify specific signals and create a corresponding neighbor relations table.

9. The base station of claim 1, wherein an output of the sniffer circuit is coupled to a self-organizing network (SON) module, enabling the SON module to perform one or more of:
maintaining a neighbor list; noting adjacent power; coordinating signal strength or power with neighbors; coordinating selection of RAT or standup of an access network; and providing analytics.

10. The base station of claim 1, wherein an output measurement of the sniffer circuit is stored together with a positioning coordinate, or a timestamp, or both, in a database.

11. The base station of claim 1, wherein the sniffer circuit is turned off or on based on a vehicle velocity.

12. The base station of claim 1, wherein the base station is a mobile base station providing LTE access in a moving vehicle, the base station being configured to detect nearby radio frequency sources using the sniffer circuit.

13. The base station of claim 1, further comprises a plurality of sniffer circuits, each of the plurality of sniffer circuits supports a single radio access technology, one or more of the plurality of sniffer circuits coupled via a bus to a radio frequency receiver circuit.

14. The base station of claim 1, further comprises an RF switch, and the sniffer circuit further comprises a plurality of layer 1/physical layer (L1/PHY) processing modules, each of the plurality of L1/PHY processing modules supports one of 2G, 3G, 4G, Wi-Fi, WiMax, or 5G radio access technology.

15. The base station of claim 14, wherein the RF switch sends a single set of RF I/Q samples to the plurality L1/PHY processing modules.

16. The base station of claim 14, wherein the RF switch is one of an Ethernet switch or common public radio interface (CPRI) switch.

17. The base station of claim 14, wherein a L1/PHY processing module of the plurality of L1/PHY processing modules provides partial network processing, the partial network processing includes processing of one or more EARFCN, signal strength, Public Land Mobile Network Identifier (PLMN ID), Physical Cell Identifier (PCI), E-UTRAN Cell Global Identifier (ECGI), or other information found in typical UE measurement reports.

18. The base station of claim 1 wherein an EARFCN is used to identify a specific cell or network of an interferer.

19. The base station of claim 1 wherein the sniffer circuit includes at least one of:
a 2G partial UE including a 2G partial UE sniffer application and a 2G partial UE interface;
a 3G partial UE including a 3G partial UE sniffer application and a 3G partial UE interface;
a 4G partial UE including a 4G partial UE sniffer application and a 4G partial UE interface; and
a 5G partial UE including a 5G partial UE sniffer application and a 5G partial UE interface;
wherein at least one of the 2G partial UE sniffer application, 3G partial UE sniffer application, 4G partial UE sniffer application, and 5G partial UE sniffer application requests cell search or measurements reports.

20. A base station, comprising:
a processor;
a memory coupled to the processor;
a base station access radio coupled to the processor;
a user equipment module, coupled to the processor, for providing a backhaul link for the base station; and
a sniffer circuit coupled to the processor, wherein the sniffer circuit further comprises:
a PHY processing layer for receiving in-phase and quadrature samples from a radio receive chain;
at least two radio access technology (RAT)-specific partial user equipment modules, for receiving the in-phase and quadrature samples from the PHY processing layer and for performing RAT-specific processing on the received samples;
wherein the base station is a mobile base station providing access in a moving vehicle, the base station being configured to detect nearby radio frequency sources using the sniffer circuit; the base station being configured to detect nearby radio frequency sources using the sniffer circuit and to turn itself on and off to avoid interference with other base stations in proximity of the vehicle, and wherein the sniffer circuit is turned off or on based on a vehicle ignition status; and
an RF switch, and wherein the sniffer circuit further comprises a plurality of layer 1/physical layer (L1/PHY) processing modules supporting at least two of 2G, 3G, 4G, Wi-Fi, WiMax, or 5G radio access technologies.

* * * * *